United States Patent [19]
Hovorka

[11] Patent Number: 5,584,113
[45] Date of Patent: Dec. 17, 1996

[54] METHOD FOR IDENTIFYING CAST PARTS

[76] Inventor: Fred D. Hovorka, 1081 Cherry St., Plymouth, Mich. 48170

[21] Appl. No.: 385,560

[22] Filed: Feb. 8, 1995

[51] Int. Cl.⁶ .............................. B21B 1/46; B29C 33/40; B29C 41/00; B29C 65/00
[52] U.S. Cl. ............................ 29/530; 264/219; 264/230; 264/249; 249/103; 425/175
[58] Field of Search ...................................... 264/132, 230, 264/249, 162, 220, 226, 227, 219; 29/527.6, 530; 425/175; 249/103

[56] References Cited

U.S. PATENT DOCUMENTS

| | | |
|---|---|---|
| 251,745 | 1/1982 | Thomas . |
| 655,393 | 8/1900 | Coleman . |
| 1,517,718 | 12/1924 | Feldner . |
| 1,901,989 | 3/1933 | Schwantes . |
| 3,093,526 | 6/1963 | Price et al. ............................. 264/249 |
| 3,934,639 | 1/1976 | McCrainor et al. ..................... 164/100 |
| 4,061,174 | 12/1977 | Edwards ....................................... 164/6 |
| 4,161,830 | 7/1979 | Gentil ......................................... 40/629 |
| 4,619,125 | 10/1986 | Choi .......................................... 40/618 |
| 4,671,916 | 6/1987 | Hamas ..................................... 264/249 |
| 4,880,583 | 11/1989 | Douglas ................................... 264/230 |
| 5,236,166 | 8/1993 | Darling . |

*Primary Examiner*—Jan H. Silbaugh
*Assistant Examiner*—Robin S. Gray
*Attorney, Agent, or Firm*—Brooks & Kushman P.C.

[57] ABSTRACT

A method and apparatus for identifying cast parts. A master is provided at least partially formed in the shape of a part to be cast. A slot is then milled into the master, the slot having a mouth and a base, and the slot having a "dovetail" cross-section so that the slot is wider at the base than at the mouth. An expandable plastic tag is inserted into the slot. The tag includes an identification surface with indicia formed thereon. Finally, the master and tag are heated, causing expansion of the tag within the slot to secure the tag within the slot. The tag includes a pair of tabs extending laterally therefrom to secure the tag in the slot prior to heat expansion of the tag.

5 Claims, 2 Drawing Sheets

METHOD FOR IDENTIFYING CAST PARTS

TECHNICAL FIELD

This invention relates to a method and apparatus for manufacturing castable materials, and more particularly to identification of cast parts.

BACKGROUND ART

Generally, in a typical casting process, one or more masters are provided at least partially in the form of a part to be cast. The master is then heated and pressed into a half of a sand mold to form the first half of the part to be cast. The sand mold includes material which makes the sand adhere to itself when it is heated. Accordingly, the hot master is pressed into the sand and pulled away, and leaves an impression in the sand in the shape of the first half of the part to be cast. The other half of the sand mold is also pressed to form the second half of the part. The two halves of the sand mold are then placed together and molten material is poured into the cavity of the sand mold. The molten material is then formed in the shape of the master.

It is known in the casting industry that castings after production are subjected to several handling operations until they reach subsequent work stations, at which further operations will be performed upon the cast part. During these handling operations, confusion can arise between cast parts, resulting in serious mistakes and severe damage during subsequent operations. It is generally difficult to distinguish cast parts of different compositions originating from different batches by their external appearance. Accordingly, attempts have been made to develop identification means for marking cast parts for future identification.

The most common presently used system for identifying cast parts comprises the use of a metal identification tag removably secured to the master. Generally, a slot is drilled in the master and a pair of holes are drilled and tapped at the bottom of the slot. A metal identification tag is then placed into the slot and screws are inserted through the tag and into the tapped holes, and are tightened to secure the tag within the slot. This system is very problematic for a number of reasons. The biggest problem with this prior art system stems from the fact that sand from the sand mold has a tendency to work its way into the tapped holes in the slot of the master. When these tags are changed during a production operation, the screws are removed, and the tag is replaced with a different tag, and the screws are replaced. If there is sand within the tapped holes as the screw is replaced, it is very easy to strip the threads of the tapped holes. This stripping of threads causes serious manufacturing problems because the holes must be welded closed, redrilled and retapped, which is a very time consuming and expensive operation and will cause significant down time for a manufacturer. Significantly, many masters are formed to comprise twenty or more part shapes, each shape having a tag thereon. Accordingly, if one tapped thread is stripped on a large master including a large number of shapes, production is seriously hindered as the hole is welded, redrilled, and retapped because the entire master is out of use as the one hole is repaired.

In order to avoid the above-referenced problems experienced with prior art systems, it would be desirable to develop an identification system for ingots which is quickly and easily replaced, and does not require screws and tapped holes to secure the identification tag.

DISCLOSURE OF INVENTION

Accordingly, it is an object of the present invention to overcome disadvantages of the prior art and make it possible to identify cast parts with an identification tag which is simply and quickly removed from and inserted into a slot formed on a casting master.

Another object of the present invention is to provide a method of identifying cast parts which does not require the use of tapped holes and screws to hold identification tags onto a casting master.

It is a further object of the present invention to provide identification tags which are easy to manufacture and may be quickly removed from a slot in a casting master and replaced without risk of creating substantial down time for the manufacturer.

In carrying out these and other objects, features and advantages of the present invention, a method is provided for identifying cast parts. The method includes the provision of a master which is at least partially formed in the shape of a part to be cast. A slot is milled into the master, the slot having a mouth and a base, and the slot having a "dovetail" cross-section so that the slot is wider at the base than at the mouth. An expandable tag is then inserted into the slot, the tag having an identification surface with indicia formed thereon. The master and tag are then heated, thereby causing expansion of the tag within the slot to secure the tag within the slot.

Also provided is an expandable plastic identification tag adapted for insertion into an inwardly drafted slot formed in a casting master. The tag comprises chamfered lower edges to facilitate insertion into the slot, and the tag comprises plastic material expandable at least 0.015 inch per inch when heated.

Further provided is an expandable identification tag adapted for insertion into an inwardly drafted slot formed in a casting master. The tag comprises a plastic material expandable at least 0.015 inch per inch when heated and includes a pair of tabs extending laterally therefrom to secure the tag within the slot prior to expansion.

Other objects, features and advantages of the present invention will be apparent to those skilled in the art when reading the following detailed description of the best mode for carrying out the invention, when taken in conjunction with the accompanying drawings wherein like reference numerals correspond to like components.

BEST MODE FOR CARRYING OUT THE INVENTION

Figure 1:
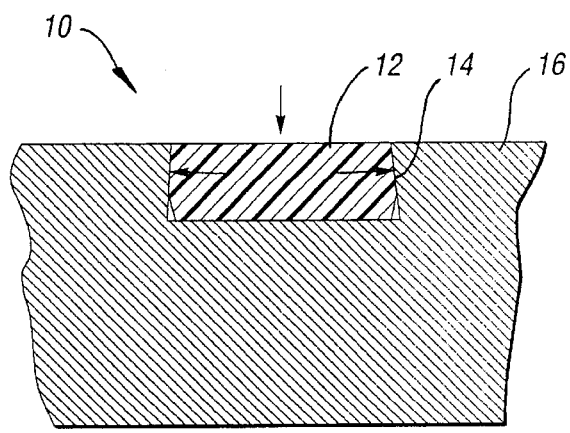
FIG. 1 shows a partial vertical cross-section of an identification tag secured within a slot formed within a casting master in accordance with the present invention.

Referring to FIG. 1, an identification system 10 is shown in accordance with the present invention for identifying parts to be cast. The identification system 10 comprises an expandable plastic tag 12 which is inserted into a slot 14 formed in a casting master 16. As shown, the tag 12 expands within the slot 14 when heat is applied, thereby causing the expanded tag to wedge against the drafted side walls of the slot 14 to secure the tag 12 within the slot 14 in order to facilitate identification of castings.

Figure 2:
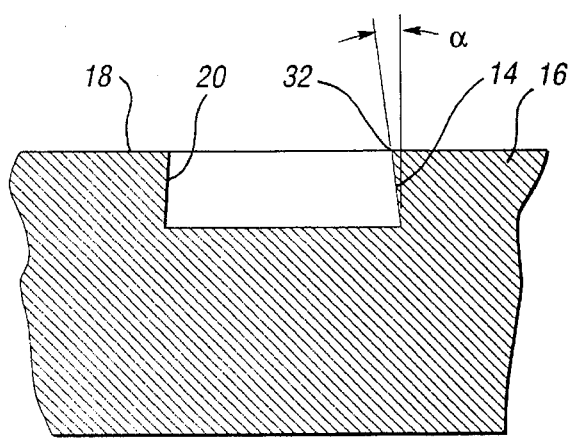
FIG. 2 shows a partial vertical cross-section of a slot formed in a casting master in accordance with the present invention.

With reference to FIG. 2, the casting master 16 is shown in greater detail. The casting master 16 includes the slot 14 formed with a backdraft angle α from the outer surface 18 of the master 16. In the preferred embodiment, the angle α is 5°. This 5° backdraft of the walls 20 of the slot 14 provides means for securing the expanded tag within the slot 14. As the tag expands with heat, the tag becomes seated against the walls 20 of the slot.

Figure 3:
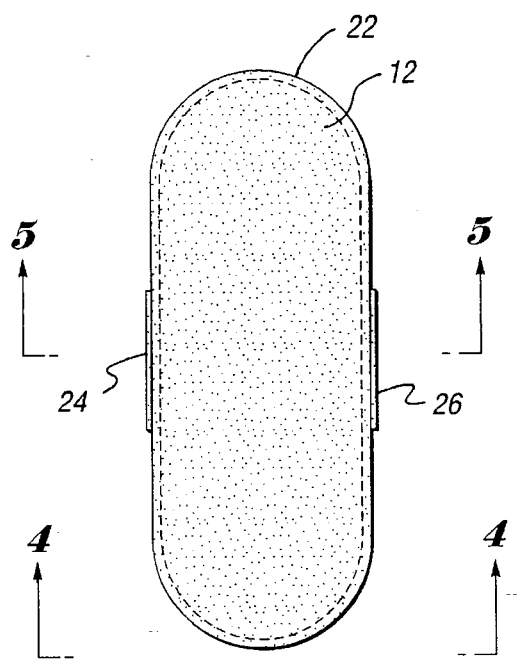
FIG. 3 shows a plan view of an identification tag in accordance with the present invention.
Figure 5:
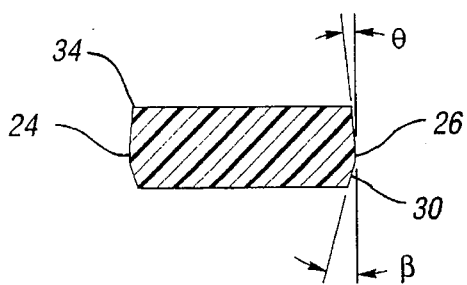
FIG. 5 shows a vertical cross-section through an identification tag in accordance with the present invention.

FIGS. 3 and 5 show the identification tag 12 to be inserted into the slot 14. As shown, the preferred embodiment of the tag 12 includes a generally cartouche-shaped periphery 22. The tag 12 includes tabs 24,26 extending laterally from the periphery 22 of the tag. These tabs are provided to hold the tag 12 within the slot 14 prior to heat expansion of the tag 12 within the slot 14. The tabs 24,26 are designed to interfere with the mouth 32 of the slot 14 adjacent the outer surface 18 of the master 16 when inserted into the slot.

Figure 4:
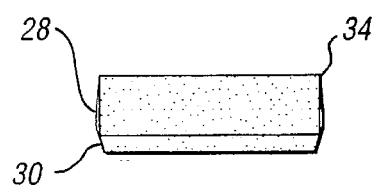
FIG. 4 shows an end view of an identification tag in accordance with the present invention.

With reference to FIGS. 4 and 5, it is shown that the walls 28 include a chamfered lower edge 30 all around the periphery 22 of the tag. The preferred embodiment comprises a 15° chamfer angle β, as shown in FIG. 5. This 15° chamfer facilitates easy insertion of the tag 12 into the slot 14. In order to insert the tag 12 into the slot 14, the chamfered lower edge 30 of the tag 12 is started into the slot past the mouth 32 of the slot (shown in FIG. 2). The operator then presses down on the tag to temporarily deform the tabs 24,26 to snap the tag into place. The tabs 24,26 then hold the tag into place prior to heat expansion of the tag. Of course, the chamfer angle β could vary significantly.

The cross-section shown in FIG. 5 is taken through the tabs 24,26, as shown in FIG. 3. A 1° draft angle (Θ) begins at the upper edge 34 of the identification tag 12 and blends into the opposing 15° chamfer of the lower edge 30. The 1° draft in cooperation with the 15° chamfer creates a protrusion which extends laterally from the side walls 36 of the tag. These peripheral protrusions define the tabs 24,26. Of course, the angle Θ could vary significantly.

Figure 6:
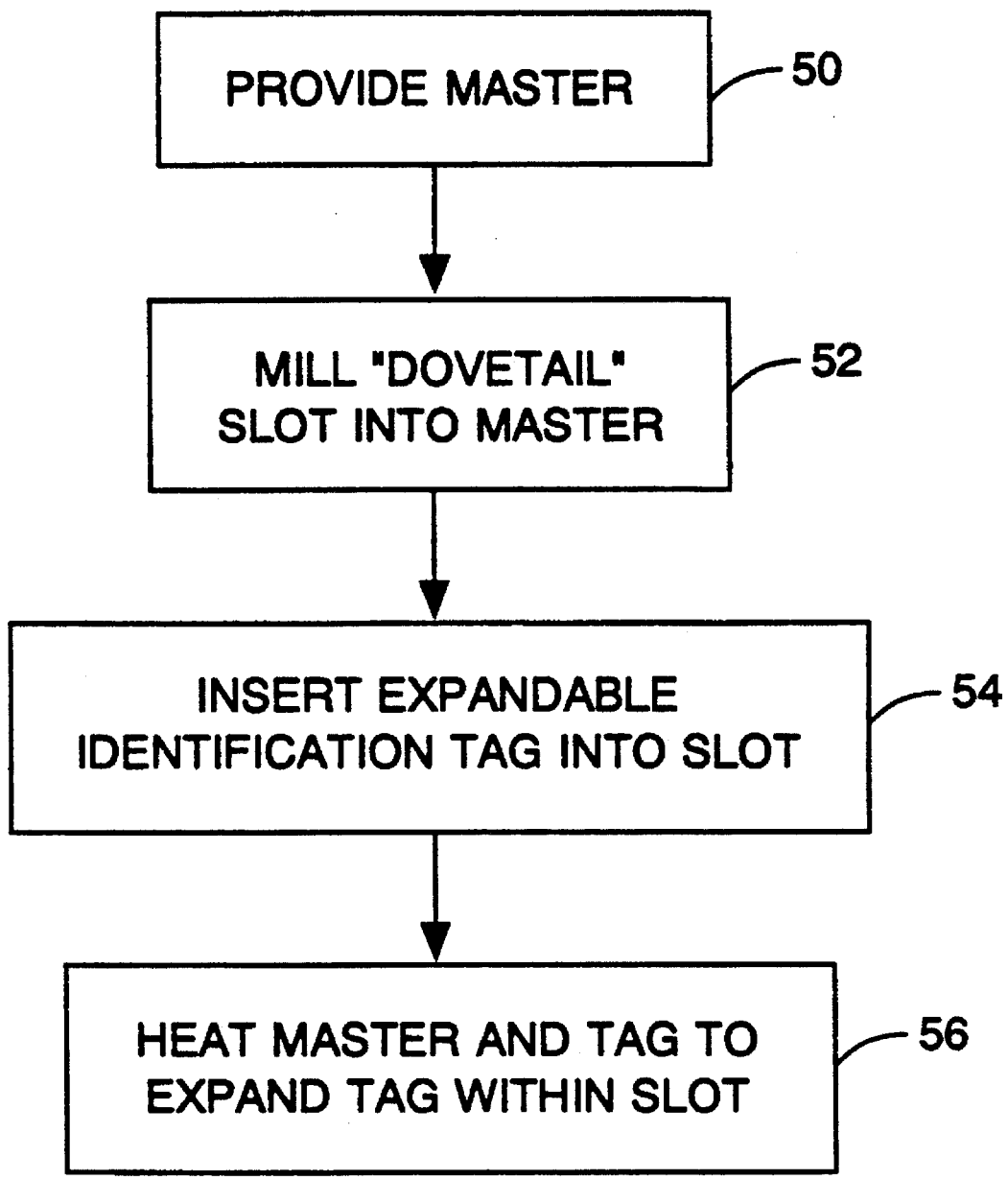
FIG. 6 shows a flow diagram of a method for identifying cast parts in accordance with the present invention.

Referring to FIG. 6, the method steps of the present invention are shown in flow diagram format. The method of identifying cast parts in accordance with the present invention comprises first providing a master 50 at least partially formed in the shape of a part to be cast. A dovetail slot is then milled into the master 52 so that the slot has a cross-section which is wider at the base then at the mouth. An expandable plastic tag is then inserted into the slot 54, the tag having an identification surface with indicia formed thereon. The master and tag are then heated 56 to cause expansion of the tag within the slot to secure the tag within the slot.

In order to further understand the configuration of the identification tag 12, it is helpful to consider the process by which the mold cavity is cut to form the shape of the identification tag. The first step is to cut in the peripheral shape of the identification tag, with the side walls 28 being substantially vertical. The 15° lower edge chamfer is cut in at the same time. The next step is to configure the identification tabs. This is performed by cutting backdrafted angles onto the side walls 36 to form the tabs 24,26. A transitional land area is created where the 1° draft of the side walls 36 blends into the 15° chamfered lower edge. This transition area establishes the outermost laterally protruding portions of the tabs 24,26. The parting line for the mold will be established at the upper edge 34. The "die lock" situation created by the 1° backdraft of the tabs is not a problem due to the substantial shrinkage factors of materials to be used for the identification tag 12. Since the material shrinks as it cools, the tab area retracts away from the walls of the mold cavity, thereby avoiding the die lock situation and allowing the identification tag to be ejected from the mold cavity.

The tag 12 is preferably made of a plastic material which expands significantly when heated. One such material is polypropylene, which expands 0.033 inch per inch when heated. This large expansion provides seating of the walls 28 of the tag against the walls 20 of the slot 14. Any expandable plastic material will be sufficient for this application, so long as it is capable of expanding sufficiently to seat the tag against the backdrafted walls of the slot. Preferably, the tag should expand at least 0.015 inches per inch when heated. However, materials with less expandability could be used if the expansion is sufficient to seat the tag. In addition, the tag is not limited to the disclosed shape or configuration. The expandability of the tag is the key to this invention.

Significantly, the identification tag of the present invention is substantially easier to replace than those provided in the prior art. In order to remove the tag 12, the operator may simply stick a brass knife other object into the plastic material and pop the tag out of the slot. In replacing the tag, the operator simply forces the tag into the slot until the tabs engage against the walls of the slot in order to secure the tag within the slot prior to heat expansion.

This invention eliminates the problems experienced with prior art systems, and greatly reduces the chances of experiencing manufacturing down time.

It will be understood, of course, that while the form of the invention herein shown and described constitutes a preferred embodiment of the invention, it is not intended to illustrate all possible forms thereof. It will also be understood that the words used are words of description rather than limitation and that various changes may be made without departing from the spirit and scope of the invention as disclosed and claimed.

What is claimed is:

1. A method for providing an identification device in a master mold used in sand mold casting parts having a defined shape, comprising:

providing a casting mold master having a surface which is at least partially formed in the defined shape;

milling a slot into said surface ofthe master, said slot having a mouth and a base, and said slot having a dovetail cross-section so that said slot is wider at said base than at said mouth;

inserting an expandable plastic tag into said slot, said tag having an identification surface with indicia formed thereon; and heating said casting mold master and said tag, thereby causing expansion of said tag within said slot to secure said tag within said slot.

2. The method of claim 1, wherein said inserting step comprises inserting the tag having chamfered lower edges to facilitate said insertion through said mouth.

3. The method of claim 1, wherein said inserting step comprises inserting the tag having a pair of tabs extending from said tag to hold said tag in said slot prior to said expansion of said tag within said slot.

4. The method of claim 2, wherein said inserting step comprises inserting the tag having a pair of tabs with inwardly drafted side walls in cooperation with said chamfered lower edges.

5. The method of claim 1, comprising the further step of expanding said tag at least 0.015 inch per inch during said heating step.

\* \* \* \* \*